(12) United States Patent
Kozlov et al.

(10) Patent No.: US 10,302,463 B2
(45) Date of Patent: May 28, 2019

(54) DISTRIBUTED FIBER SENSORS AND SYSTEMS EMPLOYING MULTICORE OPTICAL FIBERS

(71) Applicant: Corning Incorporated, Corning, NY (US)

(72) Inventors: Valery A Kozlov, Painted Post, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 193 days.

(21) Appl. No.: 15/192,114

(22) Filed: Jun. 24, 2016

(65) Prior Publication Data

US 2017/0146371 A1 May 25, 2017

Related U.S. Application Data

(60) Provisional application No. 62/257,375, filed on Nov. 19, 2015.

(51) Int. Cl.
*G02B 6/02* (2006.01)
*G01D 5/26* (2006.01)
(Continued)

(52) U.S. Cl.
CPC .............. *G01D 5/268* (2013.01); *G01K 11/32* (2013.01); *G01L 1/242* (2013.01);
(Continued)

(58) Field of Classification Search
CPC .. G02B 6/262; G02B 6/4202; G02B 6/02042; G01D 5/268; G01K 11/32; G01L 1/242
See application file for complete search history.

(56) References Cited

U.S. PATENT DOCUMENTS

| 4,300,816 A | 11/1981 | Snitzer et al. |
| 2008/0018989 A1 | 1/2008 | Tanigawa |

(Continued)

FOREIGN PATENT DOCUMENTS

| EP | 1615011 A1 | 1/2006 |
| EP | 2250462 | 11/2010 |

(Continued)

OTHER PUBLICATIONS

International Search Report and Writen Opinion PCT/US2016/061773 dated Feb. 6, 2017.

(Continued)

*Primary Examiner* — Thanh Luu
(74) *Attorney, Agent, or Firm* — Robert L. Carlson

(57) ABSTRACT

A fiber sensor that includes: an optical fiber configured for one of single or few mode operation at a wavelength from about 300 nm to about 2000 nm, and further defined by a transmission end, a scattering end, a fiber outer diameter and a fiber length from about 10 m to about 100 km. The fiber includes: a plurality of cores having equivalent core diameters and compositions; and a cladding defined by the fiber outer diameter and surrounding the cores. The fiber is tapered at the transmission end to define a tapered portion characterized by a tapered fiber out diameter and tapered core diameters smaller than the respective fiber outer diameter and core diameters. Further, the transmission end of the fiber exhibits a total backscattered signal that emanates from the cores after light from a single source has been injected into the cores at the transmission end of the fiber.

28 Claims, 2 Drawing Sheets

(51) Int. Cl.
G02B 6/26 (2006.01)
G02B 6/42 (2006.01)
G01K 11/32 (2006.01)
G01L 1/24 (2006.01)
G02B 6/12 (2006.01)

(52) U.S. Cl.
CPC ......... *G02B 6/02042* (2013.01); *G02B 6/262* (2013.01); *G02B 6/4202* (2013.01); *G02B 2006/12138* (2013.01)

(56) References Cited

U.S. PATENT DOCUMENTS

| | | | | |
|---|---|---|---|---|
| 2009/0201575 | A1* | 8/2009 | Fermann | H01S 3/06754 359/341.32 |
| 2011/0109898 | A1* | 5/2011 | Froggatt | G01B 11/18 356/73.1 |
| 2011/0274435 | A1* | 11/2011 | Fini | G02B 6/02042 398/139 |
| 2013/0291642 | A1* | 11/2013 | Crickmore | G01H 9/004 73/655 |
| 2015/0234120 | A1* | 8/2015 | Uemura | G02B 6/028 385/124 |

FOREIGN PATENT DOCUMENTS

JP 61295512 A 12/1986
WO 2012177808 12/2012

OTHER PUBLICATIONS

Yuan et al. "Bitapered fiber coupling characteristics between single-mode single-core fiber and single-mode multcore fiber" Applied Optics, 47(18) 2008, pp. 3307-3312.

Jeunhomme, "Chapter 1: Basic Theory", Single-Mode Fiber Optics: Principles and Applications, Marcel Dekker, New York ans Basel, 1990, pp. 38-44.

Luc B. Jeunhomme, Single-mode fiber optics, principales, and applications, Marcel Dekker, New York ans Basel, 1990—book.

* cited by examiner

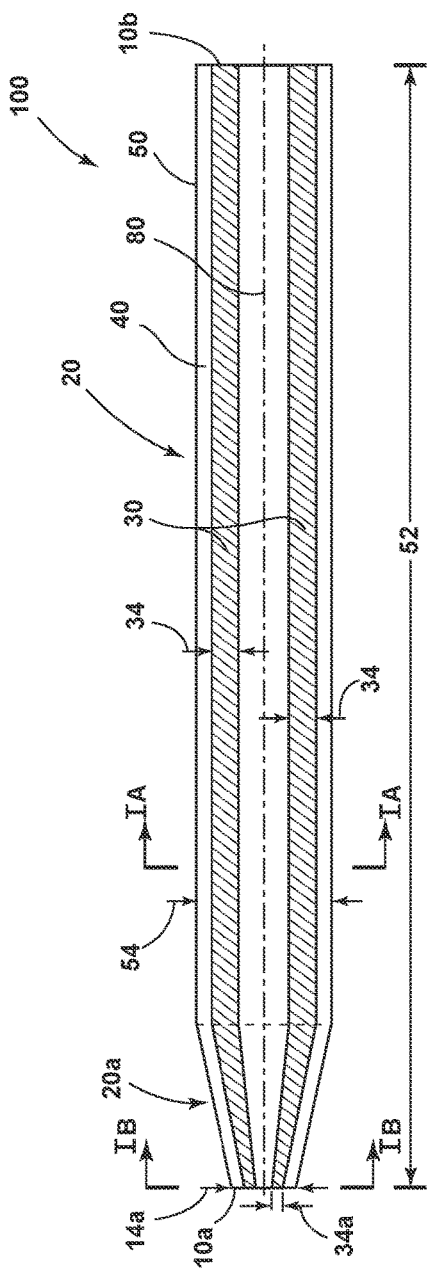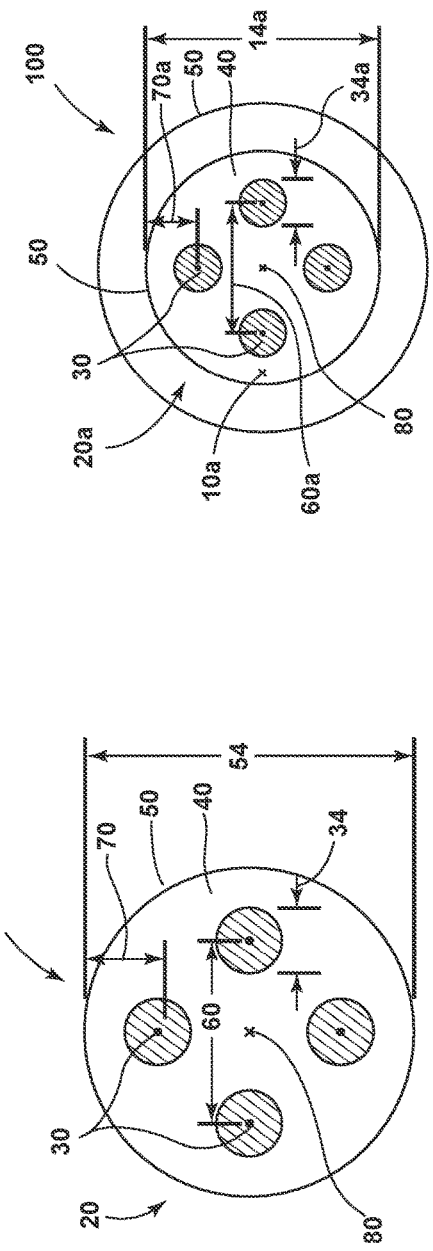

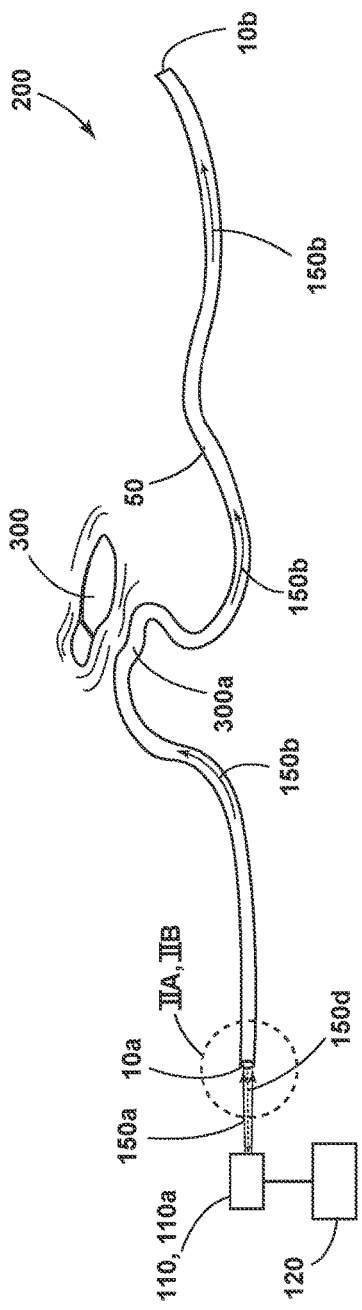
FIG. 2
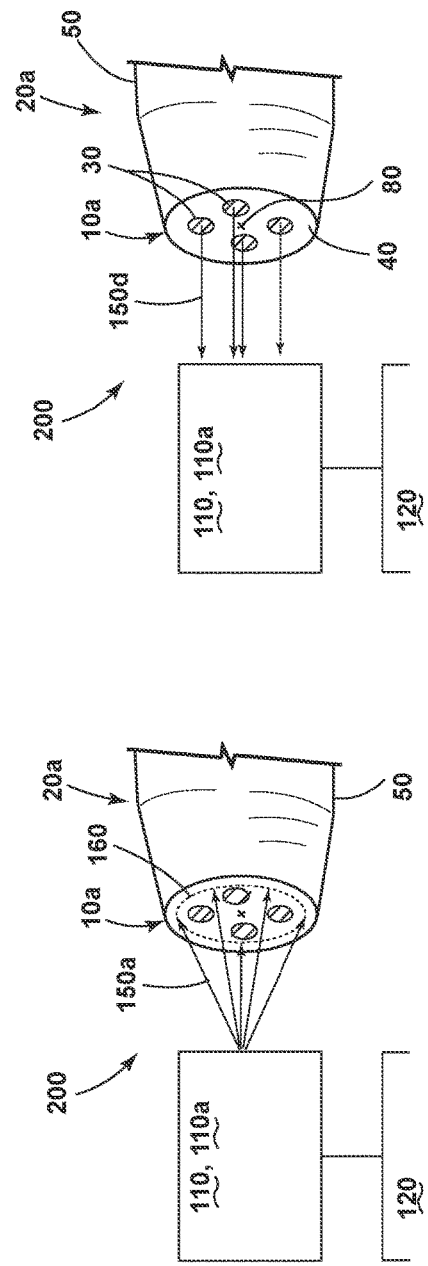
FIG. 2A
FIG. 2B

DISTRIBUTED FIBER SENSORS AND SYSTEMS EMPLOYING MULTICORE OPTICAL FIBERS

This application claims the benefit of priority under 35 U.S.C. § 119 of U.S. Provisional Application Ser. No. 62/257,375 filed on Nov. 19, 2015 the content of which is relied upon and incorporated herein by reference in its entirety.

FIELD

The disclosure generally relates to distributed fiber sensors and fiber sensor systems. More particularly, the disclosure relates to such sensors and sensor systems that employ multicore fibers which rely on Rayleigh scattering mechanisms for sensing.

BACKGROUND

Distributed fiber sensors and systems that rely on Rayleigh scattering are being adopted for many applications, including but not limited to, structure health monitoring (SHM), geotechnical engineering, power lines, oil and gas pipe lines, and oil and gas welds. In particular, these sensors and systems can employ Rayleigh scattering mechanisms to measure temperature, pressure, strain, acoustic waves and other parameters with a spatial resolution of less than 1 m.

Conventional approaches that rely on Rayleigh scattering often employ telecommunication grade optical fibers in distributed fiber sensors and systems to obtain these measurements (e.g., temperature, pressure, strain, etc.). Distributed fiber sensors and systems that rely on such optical fibers suffer from various drawbacks. For example, the optical power of the launched signal can be limited by low threshold, nonlinear effects in the fiber. As a result, the scattered signal is often low, especially at the far end of the fiber away from the transmission end. As another example, attenuation in these optical fibers can also limit the scattered signal strength at the far end of the fiber, especially for fiber spans of tens of kilometers. Further, the optical power in telecommunication grade fibers that are configured for single mode operation is often low due to the small numerical aperture of such fibers. All of these effects tend to reduce the signal-to-noise ratio associated with conventional distributed fiber sensors and systems that employ telecommunication grade optical fibers.

As distributed fiber sensors and systems that rely on optical fibers and Rayleigh scattering mechanisms continue to be employed in various applications (e.g., geotechnical engineering, power lines, etc.), the use of these sensors and systems is ultimately limited by their effectiveness at longer and longer distances.

There is therefore a need for distributed fiber sensors and fiber sensor systems that employ optical fibers that can transmit optical signals with less loss and higher signal-to-noise ratios. More particular, there is a need for distributed fiber sensors and sensor systems that employ multicore fibers which rely on Rayleigh scattering mechanisms with higher signal-to-noise ratios over a distance, particularly very long distances on the order of tens of kilometers.

SUMMARY

According to an aspect of the disclosure, a fiber sensor is provided that includes: an optical fiber configured for one of single or few mode operation at a wavelength from about 300 nm to about 2000 nm, and further defined by a transmission end, a scattering end, a fiber outer diameter and a fiber length. The optical fiber includes: a plurality of cores having equivalent core diameters and compositions; and a cladding defined by the fiber outer diameter and surrounding the plurality of cores. In addition, the fiber is tapered at the transmission end to define a tapered portion characterized by a tapered fiber outer diameter and tapered core diameters smaller than the respective fiber outer diameter and core diameters.

According a further aspect of the disclosure, a fiber sensor is provided that includes: an optical fiber configured for one of single or few mode operation at a wavelength from about 300 nm to about 2000 nm, and further defined by a transmission end, a scattering end, a fiber outer diameter and a fiber length from about 10 m to about 100 km. The optical fiber includes: a plurality of cores having equivalent core diameters and compositions; and a cladding defined by the fiber outer diameter and surrounding the plurality of cores. In addition, the fiber is tapered at the transmission end to define a tapered portion characterized by a tapered fiber outer diameter and tapered core diameters smaller than the respective fiber outer diameter and core diameters. Further, the transmission end of the fiber exhibits a total backscattered signal that emanates from the cores after light from a single source has been injected into the cores at the transmission end of the fiber.

In any of these fiber sensor aspects, the multicore fiber can be configured with 2 to 100 cores having equivalent core diameters and compositions. Other multicore fiber configurations employ 2 to 50 cores, 2 to 40 cores, 2 to 30 cores, 2 to 20 cores, 2 to 10 cores, 2 to 5 cores, and any number of cores between these specified ranges.

In some implementations of these fiber sensor aspects, the multicore fiber is configured such that each of the tapered fiber outer diameter and tapered core diameters is reduced by 1% to 95% relative to the respective fiber outer diameter and core diameters in the non-tapered portion of the fiber. Further, the tapered fiber outer diameter and tapered core diameters can be reduced by about 1%, 15%, 30%, 45%, 60%, 75%, 90%, 95%, and all percentages between these specified percentages in certain implementations.

In other implementations of these fiber sensor aspects, the multicore fiber is configured such that its length ranges from about 10 m to about 100 km. Further, the fiber length can be set at about 10 m, 20 m, 30 m, 40 m, 50 m, 60 m, 70 m, 80 m, 90 m, 100 m, 150 m, 200 m, 250 m, 300 m, 350 m, 400 m, 450 m, 500 m, 550 m, 600 m, 650 m, 700 m, 750 m, 800 m, 850 m, 900 m, 950 m, 1 km, 5 km, 10 km, 15 km, 20 km, 25 km, 30 km, 35 km, 40 km, 45 km, 50 km, 55 km, 60 km, 65 km, 70 km, 75 km, 80 km, 85 km, 90 km, 95 km, 100 km, and all length values between these specified lengths in certain implementations.

In further implementations of these fiber sensor aspects, the multicore fiber is configured such that its core-to-core spacing is at least 10 microns, the core-to-core spacing defined as the distance from the center of each core to the center of an adjacent core. In another implementation, the core-to-core spacing is set at least 20 microns. Further, the multicore fiber employed in these fiber sensor aspects can be configured with a core-to-core spacing of about 0 microns, 5 microns, 10 microns, 15 microns, 20 microns, 25 microns, 30 microns, 35 microns, 40 microns, 45 microns, 50 microns, 55 microns, 60 microns, 65 microns, 70 microns, 75 microns, 80 microns, 85 microns, 90 microns, 95 microns, 100 microns, and all spacing values between these specified core-to-core spacing amounts.

In addition, some implementations of the multicore fibers employed in these sensor aspects possess a core-to-core spacing that varies by no more than ±1% over the length of the fiber. In addition, the multicore fibers can possess a core-to-core spacing that varies by no more than ±10%, ±15%, ±20%, ±25%, ±30%, ±35%, ±40%, ±45%, ±50%, and all variability values between these specified levels.

In an embodiment of these fiber sensor aspects, the multicore fiber can be characterized by a crosstalk of no more than about −55 dB upon transmission of light into the transmission end of the fiber. Further, the multicore fiber can be configured according to other implementations of these fiber sensor aspects with a crosstalk of no more than about −80 dB, −50 dB, −45 dB, −40 dB, −35 dB, −30 dB, −25 dB, −20 dB, −15 dB, −10 dB, −5 dB, 0 dB, and all crosstalk upper limits between these specified limits.

In another embodiment of these fiber sensor aspects, the multicore fiber can be configured such that its plurality of cores includes one or more outermost cores arranged according to a core-to-cladding spacing from about 1 micron to about 200 microns, the core-to-cladding spacing defined as the distance from the center of each of the outermost cores to the fiber outer diameter. Further, the multicore fiber employed in these fiber sensor aspects can be configured with a core-to-cladding spacing of about 1 micron, 10 microns, 20 microns, 30 microns, 40 microns, 50 microns, 75 microns, 100 microns, 125 microns, 150 microns, 175 microns, 200 microns, and all spacing values between these specified core-to-cladding spacing amounts.

In another implementation of these fiber sensor aspects, the multicore fiber can be configured such that its plurality of cores at the transmission end of the fiber are arranged and configured within the fiber to receive incident light from a single light source having a spot size from about 1 micron to about 100 microns. Further, the multicore fiber employed in these fiber sensor aspects can be configured such that its plurality of cores receive incident light from a single light source having a spot size of about 1 micron, 10 microns, 20 microns, 30 microns, 40 microns, 50 microns, 60 microns, 70 microns, 80 microns, 90 microns, 100 microns, and all spot sizes between these specified spot sizes.

According to another exemplary implementation of these fiber sensor aspects, the multicore fiber can be configured such that the total backscattered signal emanating from the cores at the transmission end of the multicore fiber has a signal-to-noise ratio that is greater than a signal-to-noise ratio from a backscattered signal obtained from a reference, single core fiber. In this implementation, the reference, single core fiber is not tapered and possesses the same fiber outer diameter, core diameter, core composition, cladding composition, and length as the multicore fiber. Further, the total backscattered signal emanating from the cores of the multicore fiber can exceed the signal-to-noise ratio associated with a backscattered signal obtained from the reference, single core fiber by a factor of about 1.5, 2, 2.5, 3, 3.5, 4, 5, 5.5, 6, 6.5, 7, 7.5, 8, 8.5, 9, 9.5, 10, all values between these specified factors, and even higher factors that are substantially proportional to the number of cores in the multicore fiber.

According to another aspect of the disclosure, a fiber sensor system is provided that includes: an optical fiber configured for one of single or few mode operation at a wavelength from about 300 nm to about 2000 nm, and further defined by a transmission end, a scattering end, a fiber outer diameter and a fiber length. The optical fiber includes: a plurality of cores having equivalent core diameters and compositions; and a cladding defined by the fiber outer diameter and surrounding the plurality of cores. In addition, the fiber is tapered at the transmission end to define a tapered portion characterized by a tapered fiber outer diameter and tapered core diameters smaller than the respective fiber outer diameter and core diameters. The fiber sensor system also includes: a light source configured to direct a single spot of incident light into the plurality of cores at the transmission end of the fiber; a receive configured to receive a total backscattered signal that emanates from the cores after the single spot has been injected into the cores at the transmission end of the fiber; and a signal interrogation element configured to process the backscattered signal to obtain a sensor measurement that corresponds to a feature in proximity to or in contact with the fiber.

According to other embodiments of the fiber sensor system, any of the foregoing multicore fibers and fiber sensor configurations outlined in the disclosure can be employed in the system. In certain aspects of the fiber sensor system, the sensor measurement can include one or more characteristic from the group consisting of temperature, pressure, strain, displacement, and noise.

In certain implementations of the fiber sensor system, the system is configured for use in monitoring the health, integrity, performance and/or characteristics of a structure, a power line, an oil line or pipe, a gas line or pipe, a water-carrying line or pipe, foundation, road, channel, waterway, reservoir, well, or other geotechnical feature.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 1 is an axial cross-section schematic of a fiber sensor employing a four-core optical fiber according to an aspect of the disclosure;

FIG. 1A is a transverse cross-section schematic of the fiber sensor at a non-tapered portion of the fiber depicted in FIG. 1;

FIG. 1B is a schematic, end-on view of the tapered portion of the fiber sensor depicted in FIG. 1;

FIG. 2 is a perspective schematic view of a fiber sensor system employing a four-core optical fiber according to an aspect of the disclosure;

FIG. 2A is an enlarged, end-on schematic view of incident light directed from a light source into the cores in the optical fiber of the fiber sensor system depicted in FIG. 2; and FIG. 2B is an enlarged, end-on schematic view of a backscattered light signal emanating from the cores in the optical fiber of the fiber sensor system depicted in FIG. 2.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

Distributed fiber sensors and fiber sensor systems which rely on Rayleigh scattering mechanisms for sensing that are characterized by low signal loss and higher signal-to-noise ratios are outlined in exemplary fashion in this disclosure. More particularly, the disclosure details distributed sensors and sensor systems that employ multicore fibers with a tapered transmission end.

Referring to FIGS. 1, 1A and 1B, a fiber sensor 100 is depicted according to an aspect of the disclosure. The fiber sensor 100 includes an optical fiber 50 defined by a length 52, fiber outer diameter 54, a transmission end 10a and a scattering end 10b. The fiber 50 further includes a plurality of cores 30. As depicted in exemplary fashion in FIGS. 1, 1A and 1B, the fiber 50 contains a quantity of four cores 30. The fiber 50 also includes a cladding 40 that surrounds the cores 30 and is defined by the fiber diameter 54.

In some embodiments of the fiber sensor 100, the optical fiber 50 is defined by a length 52 that ranges from about 10 m to about 100 km. In certain embodiments, the fiber length 52 can be set at about 10 m, 20 m, 30 m, 40 m, 50 m, 60 m, 70 m, 80 m, 90 m, 100 m, 150 m, 200 m, 250 m, 300 m, 350 m, 400 m, 450 m, 500 m, 550 m, 600 m, 650 m, 700 m, 750 m, 800 m, 850 m, 900 m, 950 m, 1 km, 5 km, 10 km, 15 km, 20 km, 25 km, 30 km, 35 km, 40 km, 45 km, 50 km, 55 km, 60 km, 65 km, 70 km, 75 km, 80 km, 85 km, 90 km, 95 km, 100 km, and all length values between these specified lengths. Further, other aspects of the disclosure include optical fibers 50 with fiber lengths 52 exceeding 100 km that are viable for some applications of the fiber sensor 100 having less stringent signal-to-noise ratio and/or spatial resolution requirements (e.g., >1 m).

The optical fiber 50 employed in the fiber sensor 100 of the disclosure may, in some aspects, have a fiber diameter 54 from about 40 microns to about 1000 microns. Further, the fiber 50 employed in these aspects can be configured with a fiber diameter 54 of about 40 microns, 50 microns, 75 microns, 100 microns, 150 microns, 200 microns, 300 microns, 400 microns, 500 microns, 600 microns, 700 microns, 800 microns, 900 microns, 1000 microns, and all diameters between these specified diameters.

Referring again to FIGS. 1, 1A and 1B, the optical fiber 50 and, more particularly, the cores 30 and the cladding 40 are typically fabricated with a silica composition. Further, the optical fiber 50 and, more particularly, the cores 30 and the cladding 40 are preferably configured with various dopant levels to achieve an overall refractive index profile in the fiber sufficient for single mode or few mode operation at a wavelength from about 300 nm to about 2000 nm. In addition, the cores 30 contained within the fiber 50 are configured with substantially equivalent or equivalent core diameters 34 and compositions. In certain aspects, the cores 30 are doped with one or more dopants to raise the refractive index of the cores 30, e.g., $GeO_2$. The cladding 40, in certain implementations, is doped with one or more dopants to reduce the refractive index of the cladding, e.g., F.

As further depicted in FIGS. 1, 1A and 1B, the optical fiber 50 is configured such that its cores 30 are arranged symmetrically about a central axis 80 of the fiber according to an implementation of the fiber sensor 100 in the disclosure. Further, the cores 30 are preferably arranged substantially equal distances from the central axis 80. With regard to FIGS. 1A and 1B, the optical fiber 50 can be configured with a core-to-core spacing 60 from about 0 microns to about 100 microns. The core-to-core spacing 60 is defined as the distance from the center of each core 30 to the center of an adjacent core 30. In a preferred aspect, a core-to-core spacing 60 of greater than or equal to 10 microns is employed in the optical fiber 50. In another preferred aspect, a core-to-core spacing 60 of greater than or equal to 20 microns is employed in the optical fiber 50 within the fiber sensor 100. Further, in certain aspects of the disclosure, the optical fiber 50 employed in the fiber sensor 100 can be configured with a core-to-core spacing 60 of about 0 microns, 5 microns, 10 microns, 15 microns, 20 microns, 25 microns, 30 microns, 40 microns, 50 microns, 60 microns, 70 microns, 80 microns, 90 microns, 100 microns, and all spacing values between these specified amounts for the core-to-core spacing 60. It should be understood that the core-to-core spacing 60 could vary between adjacent cores 30 and opposing cores 30 separated by the axis 80. To the extent that these distances are not equal, the core-to-core spacing 60 is given by the smaller of the two values.

With regard to the fiber sensor 100 employing the optical fiber 50, increasing the core-to-core spacing 60 can reduce the degree of crosstalk associated with the optical signals transmitted through the cores 30. Conversely, reducing the core-to-core spacing 60 can be beneficial in ensuring that the incident light from a single light source can fully enter each of the cores 30 without appreciable loss in the cladding 40 and/or outside of the fiber 50. In view of these core-to-core spacing consideration, an embodiment of the fiber sensor 100 includes an optical fiber 50 that is characterized by a crosstalk of no more than about −55 dB upon transmission of light into the transmission end 10a in the tapered portion 20a of the fiber. Further, the optical fiber 50 can be configured according to other implementations of the fiber sensor 100 with a crosstalk of no more than about −60 dB, −50 dB, −40 dB, −30 dB, −20 dB, −10 dB, 0 dB, and all crosstalk upper limits between these specified limits.

As also depicted in FIGS. 1, 1A and 1B, the optical fiber 50 is configured such that its cores 30 have substantially equivalent or equivalent core diameters 34. In some aspects of the disclosure, the cores 30 of the fiber 50 are configured with a core diameter 34 from about 1 micron to about 20 microns. In other aspects, the cores 30 of the fiber 50 are preferably configured with a core diameter 34 from about 5 microns to about 15 microns.

According to some implementations of the fiber sensor 100, the optical fiber 50 can possess a core-to-core spacing 60 and/or core diameter 34 that varies by no more than ±1% over the length 52 of the fiber. In addition, the fiber 50 can possess a core-to-core spacing 60 and/or core diameter 34 that varies by no more than ±10%, ±15%, ±20%, ±25%, ±30%, ±35%, ±40%, ±45%, ±50%, and all variability values between these specified levels. Without being bound by theory, the backscattered signals transmitted in the optical fiber 50 of the fiber sensor 100 can demonstrate less loss, higher signal-to-noise ratios and/or better spatial resolution with controlled levels of variability in the core-to-core spacing 60 and core diameter 34 over the length 52 of the fiber.

In some embodiments of the fiber sensor 100, the optical fiber 50 can be configured with a plurality of cores 30 that ranges from 2 to 100. Other configurations of the fiber 50 can employ 2 to 50 cores, 2 to 40 cores, 2 to 30 cores, 2 to 20 cores, 2 to 10 cores, 2 to 5 cores, and any number of cores between these specified ranges.

As shown in FIG. 1A, in another embodiment of the fiber sensor 100, the optical fiber 50 can be configured such that its plurality of cores 30 includes one or more outermost cores 30 arranged according to a core-to-cladding spacing 70 from about 1 micron to about 200 microns. Further, the core-to-cladding spacing 70 is defined as the distance from the center of each of the outermost cores 30 to the fiber outer diameter 54. Further, the optical fiber 50 employed in these fiber sensor 100 aspects can be configured with a core-to-cladding spacing 70 of about 20 microns, 30 microns, 40 microns, 50 microns, 75 microns, 100 microns, 125 microns, 150 microns, 175 microns, 200 microns, and all spacing values between these specified values for the core-to-cladding spacing 70.

Referring again to FIGS. 1 and 1B, the fiber 50 is also tapered at the transmission end 10a to define a tapered portion 20a; consequently, the fiber 50 also includes a non-tapered portion 20 adjacent to the tapered portion 20. Further, the tapered portion 20 has a tapered fiber outer diameter 14a that is reduced relative to the fiber outer diameter 54 in the non-tapered portion 20. Similarly, the cores 30 in the tapered portion 20a have tapered core diameters 34a that are reduced relative to the core diameters 34 in the non-tapered portion 20. As such, the tapered portion 20a of the fiber 50 is characterized by a tapered fiber outer diameter 14a and tapered core diameters 34a that are reduced by 1% to 95% relative to the respective fiber outer diameter 54 and core diameters 34 in the non-tapered portion 20 of the fiber 50. Further, in some aspects, the tapered fiber outer diameter 14a and tapered core diameters 34a can be reduced by about 1%, 15%, 30%, 45%, 60%, 75%, 90%, 95%, and all percentages between these specified percentages in certain implementations, relative to the respective fiber outer diameter 54 and core diameters 34 in the non-tapered portion 20 of the fiber 50.

With regard to the fiber sensor 100 of the disclosure, the tapered nature of the optical fiber 50 is advantageous in facilitating the injection of incident light from a single light source into the plurality of cores 30. That is, the spot pattern from a single light source can overlap each of the cores 30 within the fiber 50 at the transmission end 10a in the tapered portion 20a of the fiber. Accordingly, in an implementation of the fiber sensor 100, the optical fiber 50 can be configured such that its plurality of cores 30 at the transmission end 10a of the fiber are arranged and configured within the fiber to receive incident light from a single light source having a spot size from about 1 micron to about 100 microns. Further, the optical fiber 50 employed in other aspects of the fiber sensor 100 can be configured such that its plurality of cores 30 receive incident light from a single light source having a spot size of about 1 micron, 10 microns, 20 microns, 30 microns, 40 microns, 50 microns, 60 microns, 70 microns, 80 microns, 90 microns, 100 microns, and all spot sizes between these specified spot sizes.

Another benefit offered by the tapering of the fiber 50 is an increased core density at the transmission end 10a of the tapered portion 20a of the fiber that would otherwise be achievable in a non-tapered fiber end having the same number of cores. By tapering the fiber 50, more cores 30 can be placed within a given spot size from an incident light source. Accordingly, the optical signals transmitted into each of the cores 30 from the light source have substantially equivalent timing with the same phase. A detector receiving the backscattered signal from each of the cores 30 can then sum these signals to increase the amplitude of the backscattered signal without the need to account for any phase or other signal timing differences between the cores 30. Consequently, the tapered nature of the optical fiber 50 results in a lower signal-to-noise ratio for the total backscattered signal emanating from the cores 30, leading to a higher spatial resolution in the fiber sensor 100 for distributed sensing applications. Further, one skilled in the field of the disclosure can configure an optical fiber 50 with a particular quantity of cores 30 with a particular level of tapering to accommodate a spot size from the single light source selected for use with the fiber sensor 100.

As the processes employed to taper the fiber 50 employed in the fiber sensor 100 can reduce the fiber diameter 54 and core diameters 34 proportionally to a tapered fiber diameter 14a and tapered core diameters 34a (see FIGS. 1 and 1B) without affecting the relative spatial arrangements of the cores 30 over a relatively short fiber length (e.g., less than 1 m), signal losses associated with the tapered portion 20a are believed to be minimal. Further, the tapering proportionally reduces the core-to-core spacing 60 in the non-tapered portion 20 of the fiber 50 to a tapered core-to-core spacing 60a in the tapered portion 20a. Similarly, the tapering proportionally reduces the core-to-cladding spacing 70 in the non-tapered portion 20 of the fiber 50 to a tapered core-to-cladding spacing 70a in the tapered portion 20a. As such, the core-to-core and core-to-cladding spatial relationships are maintained in the tapered portion 20a of the fiber, resulting in minimal optical signal loss associated with the tapering.

According to an implementation of the fiber sensor 100 depicted in FIGS. 1, 1A and 1B, the optical fiber 50 can be configured such that the total backscattered signal emanating from the cores 30 at the transmission end 10a of the fiber has a signal-to-noise ratio that is greater than a signal-to-noise ratio from a backscattered signal obtained from a reference, single core fiber. In this implementation, the reference, single core fiber is not tapered and possesses the same fiber outer diameter, core diameter, core composition, cladding composition, and length as the fiber 50. Further, the total backscattered signal emanating from the cores 30 of the optical fiber 50 can exceed the signal-to-noise ratio associated with the backscattered signal obtained from the reference, single core fiber by a factor of at least about 1.5. In certain aspects, the total backscattered signal emanating from the cores 30 of the fiber 50 can exceed the signal-to-noise ratio associated with the backscattered signal obtained from the reference, single core fiber by a factor of about 1.5, 2, 2.5, 3, 3.5, 4, 5, 5.5, 6, 6.5, 7, 7.5, 8, 8.5, 9, 9.5, 10, all values between these specified factors. Even higher signal-to-noise factors (i.e., as given by the backscattered signal emanating from the fiber 50 over the backscattered signal-to-noise ratio from the reference, single core fiber) that are substantially proportional to the number of cores 30 in the optical fiber 50 can be achieved according to other aspects of the disclosure.

Referring again to FIGS. 2, 2A and 2B, a fiber sensor system 200 employing an optical fiber 50 is depicted according to another aspect of the disclosure. The sensor system 200 includes an optical fiber 50 configured for one of single mode or few mode operation at a wavelength from about 300 nm to about 2000 nm. Further, the optical fiber 50 is defined by a transmission end 10a, a scattering end 10b and a tapered portion 20a. In addition, the optical fiber 50 employed in the sensor system 200 includes a plurality of cores 30 having equivalent core diameters and compositions, along with a cladding 40 surrounding the cores 30. Unless otherwise noted, the optical fiber 50, along with its associated elements (e.g., cladding 40), depicted in FIGS. 2, 2A and 2B is configured with the same or similar features and functions as the fiber 50 depicted in FIGS. 1, 1A and 1B.

The fiber sensor system 200 depicted in FIGS. 2, 2A and 2B also includes a light source 110 configured to direct a single spot 160 of incident light 150a into the plurality of cores 30 at the transmission end 10a of the fiber 50. As shown in FIG. 2A, the light source 110 produces an optical signal 150a having a spot size 160 that overlaps with the ends of the cores 30 at the transmission end 10a in the tapered portion 20a of the fiber 50. By virtue of the tapering in the fiber 50, the spot 160 can overlap with each of the cores 30 within the fiber 50 to ensure that the optical signal injected into the cores has the same timing and phase as it is transmitted down the length of the fiber. Light sources 110 suitable for use in the fiber sensor system 200 include but are not limited to: a tunable laser, LED light source, semiconductor laser diode and a laser diode.

Again referring to FIGS. 2, 2A and 2B, the fiber sensor system 200 further includes a receiver 110a configured to receive a total backscattered signal 150d that emanates from the cores 30 after the incident light 150a from the single spot 160 has been injected into the cores 30 at the transmission end 10a of the fiber 50. As specifically depicted in FIGS. 2, 2A and 2B, the light source 110 and receiver 110a are contained in a single unit and the signals 150a and 150d are decoupled through means understood by those skilled in the field of this disclosure. Those skilled in the field can also appreciate that the light source 110 and receiver 110a can be configured as separate units within the sensor system 200, each handling the respective optical signal 150a and total backscattered signal 150d. The receiver 110a for use in the fiber sensor system 200 may include a photodetector, e.g., a diode assembly, single photo diode, or any other receiver suitable to perform the intended function of the receiver 110a in the system 200 as understood by those skilled in the field of the disclosure.

Still referring to FIGS. 2, 2A and 2B, the fiber sensor system 200 also includes a signal interrogation element 120 that is coupled to the light source 110 and the receiver 110a. The signal interrogation element 120 is configured to process the backscattered signal 150d to obtain a sensor measurement that corresponds to a feature in proximity to or contacting the fiber 50. Suitable signal interrogation elements 120 for use in the fiber sensor system 200 include but are not limited to devices, elements and assemblies understood in the field of the disclosure that can detect or otherwise process signal amplitude, signal phase and/or signal frequency associated with the backscattered signal 150d.

As also depicted in FIGS. 2, 2A and 2B, the fiber sensor system 200 can be configured according to an aspect of the disclosure to obtain a sensor measurement (e.g., a pressure reading) that corresponds to a feature, e.g., footstep 300, in proximity to the optical fiber 50. More particularly, the light source 110 and the optical fiber 50 within the system 200 are configured such that incident light 150a produces a spot 160 that is injected into the plurality of cores 30 at the transmission end 10a of the fiber 50 (see FIG. 1A). The incident light 150a propagates through the cores 30 of the fiber 50 toward the scattering end 10b. The incident light 150a scatters throughout the length of the fiber according to Rayleigh scattering mechanisms (e.g., from microscale and/or nanoscale defects in the fiber) and a portion of the incident light is scattered back toward the transmission end 10a of the fiber through the cores 30 as a backscattered signal 150d.

Referring again to FIGS. 2, 2A and 2B, as the incident light 150a propagates through the cores 30 of the fiber 50, the wavelength of the backscattered signal 150d can be shifted based on local displacement, temperature changes, and/or deformation of the fiber associated with a feature (e.g., a footstep 300) in proximity or in contact with the fiber at a particular location, such as location 300a shown in FIG. 2. Consequently, the total backscattered signal 150d can possess a wavelength that is shifted relative to the incident light 150a. As such, the backscattered signal 150d emanating from the cores can be summed into a total backscattered signal by the receiver 110a and/or the signal interrogation element 120 to calculate the particular parameter associated with the feature 300, e.g., pressure, that can be correlated to the wavelength shift between the incident light 150a and the backscattered signal 150d.

The fiber sensor system 200 can also be configured to make use of the total backscattered signal 150d to estimate time and location-related information associated with the feature 300 in proximity to or in contact with the fiber 50. In particular, the light source 110, receiver 110a and signal interrogation element 120 can be configured within the fiber sensor system 200 to measure the fraction of light that is reflected back through the fiber 50 via Rayleigh scattering mechanisms using optical time-domain reflectometry (OTDR). In particular, the system 200 can compare the amount of light in the total backscattered signal 150d compared to the incident light 150a at different times to ascertain the location 300a associated with the feature 300 in proximity to or in contact with the fiber 50.

Each of the distributed fiber sensors and sensor systems outlined in the disclosure, including fiber sensor 100 and fiber sensor system 200, demonstrate one or more of the following advantages over conventional distributed fiber sensors and sensor systems that employ single core, optical fibers, e.g., commercial grade telecommunication grade optical fibers. One advantage of the fiber sensors and sensor systems of the disclosure is that the backscattered signal from their multicore fibers will be greater than the backscattered signal from a conventional, single core fiber by a factor substantially equivalent to the number of cores in the multicore fibers. Consequently, the signal-to-noise ratio of the backscattered signal associated with the fiber sensors and sensor systems of the disclosure can be significantly improved over the signal-to-noise ratio of conventional fiber sensors and systems. Another advantage is that lower power signals that are less susceptible to non-linear scattering effects can be launched into each core of the multicore fibers in the disclosure to achieve roughly the same backscattered signal strength as a higher power signal transmitted into a conventional single core fiber. A further advantage of the multicore fiber employed in the sensors and systems of the disclosure is that its tapered end can be easily configured to match the spot size associated with current light source and photo detector spot sizes. In addition, the processes employed to taper the transmission end of these multicore fibers is relatively low in cost and the tapering itself induces very little signal loss in the fiber. Another benefit of the distributed fiber sensors and systems of the disclosure is that the multicore fibers employed in them can be used with existing fiber coating compositions, fiber cable designs and distributed fiber sensor system architectures with no significant process and/or design adjustments.

Further, it will be apparent to those skilled in the art that various modifications and variations can be made without departing from the spirit or scope of the claims.

What is claimed is:

1. A fiber sensor system, comprising:
    an optical fiber configured for one of single or few mode operation at a wavelength from 300 nm to 2000 nm, and further defined by a transmission end, a scattering end, a fiber outer diameter and a fiber length, the fiber comprising:

a plurality of cores having equivalent core diameters and compositions, and a cladding defined by the fiber outer diameter and surrounding the plurality of cores;

a light source configured to direct a single spot of incident light into the plurality of cores at the transmission end of the fiber; and a receiver configured to receive a total backscattered signal that emanates from the cores after the spot has been injected into the cores at the transmission end of the fiber, wherein the fiber is tapered at the transmission end to define a tapered portion characterized by a tapered fiber outer diameter and tapered core diameters smaller than the respective fiber outer diameter and core diameters.

2. The sensor system according to claim 1, wherein each of the tapered fiber outer diameter and tapered core diameters is reduced by 15% to 95% relative to the respective fiber outer diameter and core diameters.

3. The sensor system according to claim 1, wherein the fiber length is from 10 m to 100 km.

4. The sensor system according to claim 1, wherein the optical fiber is configured for single mode operation at a wavelength from 300 nm to 2000 nm.

5. The sensor system according to claim 1, wherein the cores are arranged according to a core-to-core spacing of at least 10 microns, the core-to-core spacing defined as the distance from the center of each core to the center of an adjacent core.

6. The sensor system according to claim 5, wherein the fiber is characterized by a crosstalk of no more than −5 dB upon transmission of light into the transmission end of the fiber.

7. The sensor system according to claim 1, wherein the plurality of cores comprises one or more outermost cores arranged according to a core-to-cladding spacing from 1 micron to 100 microns, the core-to-cladding spacing defined as the distance from the center of each of the outermost cores to the fiber outer diameter.

8. A fiber sensor, comprising:

an optical fiber configured for one of single or few mode operation at a wavelength from 300 nm to 2000 nm, and further defined by a transmission end, a scattering end, a fiber outer diameter and fiber length, the fiber comprising:

a plurality of cores having equivalent core diameters and compositions; and a cladding defined by the fiber outer diameter and surrounding the plurality of cores, wherein the fiber is tapered at the transmission end to define a tapered portion characterized by a tapered fiber outer diameter and tapered core diameters smaller than the respective fiber outer diameter and core diameters, and further wherein the plurality of cores at the transmission end of the fiber are arranged and configured within the fiber to receive incident light from a single light source having a spot size from 1 micron to 100 microns.

9. The sensor according to claim 8, wherein each of the tapered fiber outer diameter and tapered core diameters is reduced by 15% to 95% relative to the respective fiber outer diameter and core diameters.

10. The sensor according to claim 8, wherein the fiber length is from 10 m to 100 km.

11. The sensor according to claim 8, wherein the optical fiber is configured for single mode operation at a wavelength from 300 nm to 2000 nm.

12. The sensor according to claim 8, wherein the cores are arranged according to a core-to-core spacing of at least 10 microns, the core-to-core spacing defined as the distance from the center of each core to the center of an adjacent core.

13. The sensor according to claim 12, wherein the fiber is characterized by a crosstalk of no more than −5 dB upon transmission of light into the transmission end of the fiber.

14. The sensor according to claim 8, wherein the plurality of cores comprises one or more outermost cores arranged according to a core-to-cladding spacing from 1 micron to 100 microns, the core-to-cladding spacing defined as the distance from the center of each of the outermost cores to the fiber outer diameter.

15. A fiber sensor, comprising:

an optical fiber configured for single mode operation at a wavelength from 300 nm to 2000 nm, and further defined by a transmission end, a scattering end, a fiber outer diameter and a fiber length from 10 m to 100 km, the fiber comprising:

a plurality of cores having equivalent core diameters and compositions; and a cladding defined by the fiber outer diameter and surrounding the plurality of cores, wherein the fiber is tapered at the transmission end to define a tapered portion characterized by a tapered fiber outer diameter and tapered core diameters smaller than the respective fiber outer diameter and core diameters, and further wherein the transmission end of the fiber exhibits a total backscattered signal that emanates from the cores after light from a single source has been injected into the cores at the transmission end of the fiber.

16. The sensor according to claim 15, wherein the total backscattered signal has a signal-to-noise ratio that is greater than a signal-to-noise ratio from a backscattered signal from a reference, single-core optical fiber, and further wherein each of the tapered fiber outer diameter and tapered core diameters is reduced by 15% to 95% relative to the respective fiber outer diameter and core diameters.

17. The sensor according to claim 15, wherein the total backscattered signal has a signal-to-noise ratio that is at least two times greater than a signal-to-noise ratio from a backscattered signal from a reference, single-core optical fiber.

18. The sensor according to claim 15, wherein the cores are arranged according to a core-to-core spacing of at least 10 microns, the core-to-core spacing defined as the distance from the center of each core to the center of an adjacent core.

19. The sensor according to claim 18, wherein the fiber is characterized by a crosstalk of no more than −5 dB upon transmission of light into the transmission end of the fiber.

20. The sensor according to claim 15, wherein the plurality of cores comprises one or more outermost cores arranged according a core-to-cladding spacing from 1 micron to 200 microns, the core-to-cladding spacing defined as the distance from the center of each of the outermost cores to the fiber outer diameter.

21. The sensor according to claim 15, wherein the plurality of cores at the transmission end of the fiber are arranged and configured within the fiber to receive incident light from a single light source having a spot size from 1 micron to 100 microns.

22. A fiber sensor system, comprising:

an optical fiber configured for one of single or few mode operation at a wavelength from 300 nm to 2000 nm, and further defined by a transmission end, a scattering end, a fiber outer diameter and a fiber length, the fiber comprising:

a plurality of cores having equivalent core diameters and compositions, and a cladding defined by the fiber outer diameter and surrounding the plurality of cores, a light source configured to direct a single spot of incident light into the plurality of cores at the transmission end of the fiber;

a receiver configured to receive a total backscattered signal that emanates from the cores after the spot has been injected into the cores at the transmission end of the fiber; and a signal interrogation element configured to process the backscattered signal to obtain a sensor measurement that corresponds to a feature in proximity to or in contact with the fiber, wherein the fiber is tapered at the transmission end to define a tapered portion characterized by a tapered fiber outer diameter and tapered core diameters smaller than the respective fiber outer diameter and core diameters.

23. The system according to claim 22, wherein the fiber length is from 10 m to 100 km.

24. The system according to claim 22, wherein the optical fiber is configured for single mode operation at a wavelength from 300 nm to 2000 nm.

25. The system according to claim 24, wherein the plurality of cores comprises one or more outermost cores arranged according a core-to-cladding spacing from 1 micron to 100 microns, the core-to-cladding spacing defined as the distance from the center of each of the outermost cores to the fiber outer diameter.

26. The system according to claim 24, wherein each of the tapered fiber outer diameter and tapered core diameters is reduced by 15% to 95% relative to the respective fiber outer diameter and core diameters.

27. The system according to claim 22, wherein the cores are arranged according to a core-to-core spacing of at least 10 microns, the core-to-core spacing defined as the distance from the center of each core to the center of an adjacent core.

28. The system according to claim 27, wherein the fiber is characterized by a crosstalk of no more than −5 dB after the single spot has been injected into the cores at the transmission end of the fiber.

* * * * *

UNITED STATES PATENT AND TRADEMARK OFFICE
CERTIFICATE OF CORRECTION

PATENT NO. : 10,302,463 B2
APPLICATION NO. : 15/192114
DATED : May 28, 2019
INVENTOR(S) : Valery A Kozlov et al.

Page 1 of 1

It is certified that error appears in the above-identified patent and that said Letters Patent is hereby corrected as shown below:

On the Title Page

In Column 2, item (56), Other Publications, Line 1, delete "Writen" and insert -- Written --, therefor.

On page 2, in Column 2, item (56), Other Publications, Line 2, delete "multcore" and insert -- multicore --, therefor.

On page 2, in Column 2, item (56), Other Publications, Line 5, delete "ans" and insert -- and --, therefor.

On page 2, in Column 2, item (56), Other Publications, Line 8, delete "ans" and insert -- and --, therefor.

In the Claims

In Column 11, Line 44, Claim 8, before "fiber" insert -- a --.

Signed and Sealed this
Twenty-sixth Day of November, 2019

Andrei Iancu
*Director of the United States Patent and Trademark Office*